United States Patent
Pagliacci

(10) Patent No.: US 9,492,950 B2
(45) Date of Patent: Nov. 15, 2016

(54) PLASTIC PREFORM

(75) Inventor: Gianfilippo Pagliacci, Milan (IT)

(73) Assignee: CONCORDIA DEVELOPMENT S.R.L., Milan (IT)

( * ) Notice: Subject to any disclaimer, the term of this patent is extended or adjusted under 35 U.S.C. 154(b) by 696 days.

(21) Appl. No.: 12/444,515

(22) PCT Filed: Oct. 3, 2007

(86) PCT No.: PCT/IB2007/054015
§ 371 (c)(1),
(2), (4) Date: Apr. 6, 2009

(87) PCT Pub. No.: WO2008/041186
PCT Pub. Date: Apr. 10, 2008

(65) Prior Publication Data
US 2010/0081003 A1    Apr. 1, 2010

(30) Foreign Application Priority Data

Oct. 6, 2006 (IT) .............................. MI2006A1922

(51) Int. Cl.
| | | |
|---|---|---|
| *B29B 11/14* | (2006.01) | |
| *B29C 49/12* | (2006.01) | |
| *B29B 11/08* | (2006.01) | |
| *B29C 49/06* | (2006.01) | |
| *B29C 49/16* | (2006.01) | |
| *B29C 49/78* | (2006.01) | |
| *B29K 67/00* | (2006.01) | |
| *B29K 105/00* | (2006.01) | |

(52) U.S. Cl.
CPC .............. *B29B 11/14* (2013.01); *B29C 49/12* (2013.01); *B29B 11/08* (2013.01); *B29B 2911/1402* (2013.01); *B29B 2911/1404* (2013.01); *B29B 2911/14026* (2013.01); *B29B 2911/14033* (2013.01); *B29B 2911/1444* (2013.01); *B29B 2911/14106* (2013.01); *B29B 2911/14133* (2013.01); *B29B 2911/14333* (2013.01);

(Continued)

(58) Field of Classification Search
CPC .................. B29B 11/14; B29B 11/08; B29B 2911/1402; B29B 2911/14013; B29B 2911/14886; B29C 49/12; B29C 49/06; B29C 2949/00; B29C 2949/78563; B29C 49/16; B29C 49/78; B29C 49/783; B29K 2067/00
USPC .............. 428/35.7, 36.9, 36.91, 36.92, 542.8
See application file for complete search history.

(56) References Cited

U.S. PATENT DOCUMENTS

| | | | |
|---|---|---|---|
| 3,955,697 A | * | 5/1976 | Valyi ............................ 215/12.2 |
| 4,395,378 A | | 7/1983 | Alberghini et al. |

(Continued)

FOREIGN PATENT DOCUMENTS

| | | | |
|---|---|---|---|
| DE | 199 25 695 | | 12/2000 |
| EP | 0108307 | * | 5/1984 |

(Continued)

OTHER PUBLICATIONS

International Search Report dated Mar. 23, 2009, from corresponding PCT application.

*Primary Examiner* — Yan Lan
(74) *Attorney, Agent, or Firm* — Young & Thompson

(57) ABSTRACT

A preform (1) of plastic material for manufacturing bottles through a blow-moulding process includes a substantially cylindrical central body (3) having an open end (2) and a closed end (4). In correspondence of the central area of the closed end (4) there is provided a hollow appendix (5), projecting outwards of the preform, capable of internally housing the tip end of a stretching rod of the preform (1). Both the hollow appendix (5) and the remaining side portion of the closed end (4) of the preform may be spherical, conical, elliptical or parabolic.

20 Claims, 1 Drawing Sheet

(52) U.S. Cl.
CPC ............... *B29B2911/14466* (2013.01); *B29B 2911/14486* (2013.01); *B29C 49/06* (2013.01); *B29C 49/16* (2013.01); *B29C 49/78* (2013.01); *B29C 49/783* (2013.01); *B29K 2067/00* (2013.01); *B29K 2105/258* (2013.01)

(56) References Cited

U.S. PATENT DOCUMENTS

| | | | | |
|---|---|---|---|---|
| 4,927,679 | A | * | 5/1990 | Beck .................... 428/36.92 |
| 5,290,506 | A | * | 3/1994 | Yokobayashi .......... B29C 49/12 264/520 |
| 5,508,076 | A | * | 4/1996 | Bright ...................... 428/36.6 |
| 6,852,267 | B1 | | 2/2005 | Keller |

FOREIGN PATENT DOCUMENTS

| | | |
|---|---|---|
| JP | 54-146870 | 11/1979 |
| JP | 3-295615 | 12/1991 |
| JP | 4-069226 | 3/1992 |
| JP | 2002-067128 | 3/2002 |
| WO | 90/04543 | 5/1990 |

\* cited by examiner

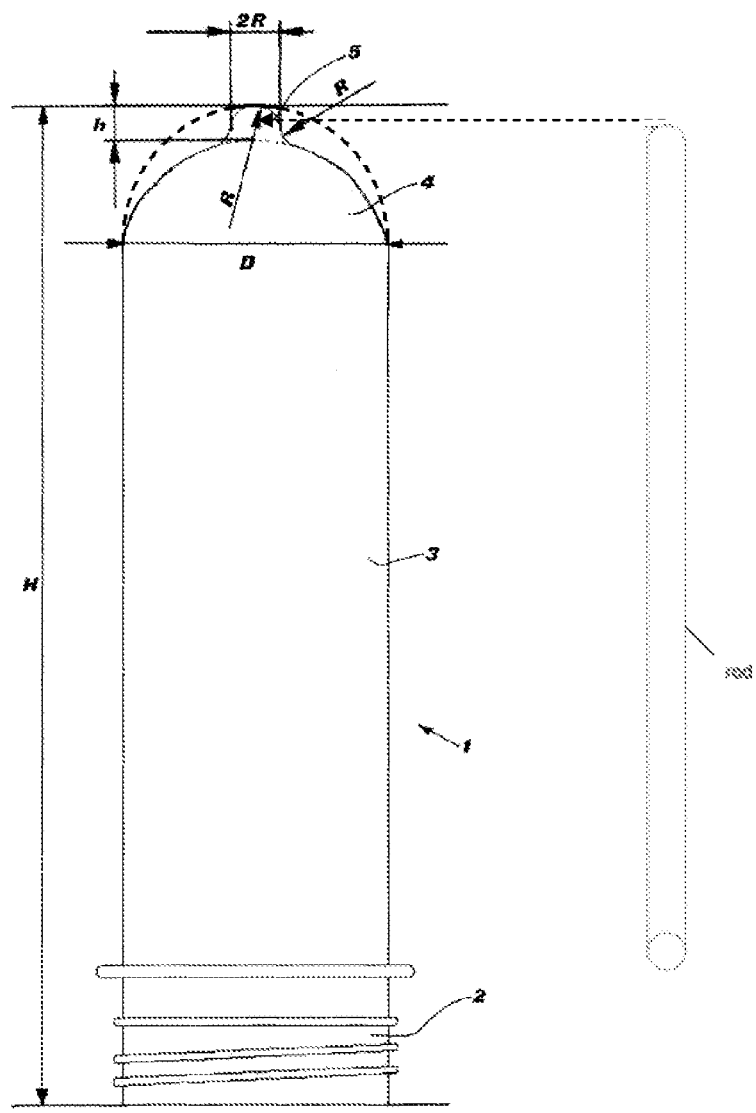

US 9,492,950 B2

PLASTIC PREFORM

BACKGROUND OF THE INVENTION

1. Field of the Invention

The present invention refers to an improved preform for manufacturing hollow bodies and, in particular, bottles of any kind and size, through a blow-moulding process.

2. Description of Related Art

As is well-known to people skilled in the field, the manufacture of bottles or jars of plastic material today is almost exclusively carried out through a 2-step process which comprises the manufacture and use of hollow, semi-finished products having a substantially cylindrical shape, known precisely as preforms or parisons. In the first step of such process the manufacture of hollow preforms is hence accomplished—in a highly centralised manner, i.e. by few specialised manufacturers—said preforms having great thickness and longitudinal and crosswise size in a ratio of about 1:2 to 1:4 with respect to that of the finished bottle. In the second step of the process—which generally occurs instead in the same plant where bottling of the liquid to be packaged takes place—the hollow preforms are introduced into a mould, heated up to a temperature sufficient to accomplish the necessary softening thereof, stretched to the final length of the bottle by means of a stretching rod introduced in the preform, and hence blow-moulded by introducing one or more flows of compressed air in the heated and stretched preform.

This manufacturing system allows dramatic and various advantages in the entire manufacturing chain, which are well-known to people skilled in the field and which hence do not need to be recalled here, which advantages have led—as it was mentioned earlier—to the almost general adoption, at a global level, of this manufacturing system to achieve hollow bodies and in particular bottles of any kind, shape and size.

In particular, the above-described process has found a particularly suited application in the use of clear plastic materials, such as for example PET (polyethylenterephtalate), which, during the blowing process, undergo such an orientation of the crystalline structure to impart the bottle particularly satisfactory mechanical characteristics, even with very small final thickness values of the material.

Precisely for this type of bottles, a constant search for the optimisation of the manufacturing process has hence developed in order to reduce—the final bottle volume being the same—the quantity of plastic material used and hence the final cost of the bottle. Up until today such search was mainly aimed on the one hand at shape changes of the finished bottle (to create a greater shape stability) and, on the other hand, at the adjustment of the different moulding parameters (stretching ratio of the preform, heating temperature, pressure of the blown air and the like).

Substantially unchanged over time has remained instead the shape of the preform which, as said, consists of a hollow cylindrical body, having a constant or variable thickness, whose open end has already the final shape of the neck area of the bottle—and hence also provided with the necessary threadings for coupling the screw cap—and whose closed end in most cases is semispherical.

In order to reduce the amount of plastic material which, in the finished bottle, remains in the central area of the bottom of the same and hence is of no direct usefulness, preforms with a non-spherical head and, in particular, with a head having a conical, elliptical or parabolic shape have then been suggested and partly used. However, while preforms of this type have actually allowed some advantages during the moulding of the preforms, allowing a modest moulding time reduction thanks to the increased streamlining of the flow path of the melted plastic material (which, as a matter of fact, is injected in correspondence of the vertex of the closed end of the preform), they have not allowed instead appreciable results in terms of reducing the preform weight, since material distribution in the finished bottle did not finally appear significantly different from that of the bottles obtained from preforms having a semispherical head.

SUMMARY OF THE INVENTION

The object of the present invention is hence that of providing an improved preform which, the dimensional and mechanical characteristics of the bottle obtained therefrom being the same, has a remarkably reduced weight compared to that of currently-used known-type preforms.

Another object of the invention is that of providing an improved preform by means of which it is possible to obtain that the weight reduction of the bottle obtained therefrom be concentrated in correspondence of a central area of the bottle bottom.

BRIEF DESCRIPTION OF THE DRAWING FIGURE

Further features and advantages of the present invention will be more evident from the following description of a preferred embodiment of the same, illustrated in the accompanying drawing showing a diagrammatic side view of an improved cylindrical preform according to the present invention.

DETAILED DESCRIPTION OF THE INVENTION

As it appears clearly from the drawing, preform 1 according to the invention has a fully conventional structure, both in terms of the shape of open end 2, provided in a known manner with threadings and ribs for the housing and abutment of the bottle screw cap, and in terms of the elongated, cylindrical shape of body 3 of the preform.

As a matter of fact, the innovation of the preform of the invention lies exclusively in the shape of the closed end or head 4 of the preform, in correspondence of whose central portion there is formed an axial appendix 5 suitably radiussed to the remaining side portion of head 4. Said remaining side portion of head 4 can have any one of the known shapes described above and, preferably, has a semispherical shape.

The shape of appendix 5 and its size are not particularly limited, since the inner diameter of such appendix needs only to be large enough to be able to house therein the tip of the stretching rod of the preform (shown in the sole Figure), at the beginning of the moulding step. In the embodiment shown, appendix 5 also has a semispherical shape with radius R and is preferably radiussed to the side portion of closed end 4 by means of a curved, externally concave surface having identical radius R.

Radius R of appendix 5 and its overall height h, with respect to a tangential plane to the theoretical tip of a completely semispherical head (shown by a dashed phantom line in the drawing), determines the features of the preform of the invention. The minimum value which R can take up, R=Rmin, as said above is the one corresponding to an inner diameter of appendix 5 suitable to allow the close-fit introduction, within the same, of the stretching rod of the preform; the maximum value which R can take up, $R=R_{max}$, corresponds instead to D/2, where D is the diameter of the cylindrical central portion 3 of the preform. The overall height H of the preform being equal, the weight reduction effect of the preform is of course highest for $R=R_{min}$, while the effect is instead minimal, or more precisely nil, when $R=R_{max}$ i.e. when the preform of the invention has a shape of head 4 matching that of a conventional mould with a fully semispherical head.

Similar observations apply to height h of appendix 5, since it is evident that—again the overall height H of the preform being the same—the weight reduction of the preform is the greater, the greater height h is, starting from a value $h_{min}=0$, wherein the preform of the invention has a shape of head 4 matching that of a conventional preform having a fully semispherical head.

Within the above-said variability ranges, the dimensions and shape of appendix 5 may be varied at pleasure, depending on the desired results, for example in order to concentrate the weight loss of the preform in correspondence of the central area of the bottom of the bottle formed with the same, or for other purposes which from time to time may become useful or convenient for the different, individual applications.

Thanks to the specific shape described above of the preform of the invention, the extraordinary result is hence obtained of a preform having a smaller weight than a known-type preform having the same thickness and height, thanks to the fact that the overall surface of the preform of the invention evidently has a smaller development than that of a corresponding, conventional preform with a fully semispherical head and of equal height. The weight reduction of the preform which can thereby be obtained can reach about 3-5% and this remarkable result is furthermore achieved without having to vary in the least the other characteristics of the preform, and in particular the axial stretching ratio of the same. The stretching rod, possibly changed in its final part to adapt to the inner shape of appendix 5, can penetrate into appendix 5 and it hence determines a lengthening of the preform of the invention identical to the one it would cause in a conventional preform which a semispherical head of the same overall height H. The stretching action is furthermore more even and homogeneous thanks to the fact that appendix 5 already represents a bevel for the deformed shape of the preform.

The preform of the invention can hence replace a conventional preform without the need to carry out a new calibration of the blow-moulding process and thereby obtaining, in a simple and direct way, a remarkable reduction of the preform weight, and hence of the finished bottle, thereby reaching a first object of the invention. By suitably adjusting the dimensional parameters of appendix 5 it is besides possible to concentrate the weight reduction in correspondence of the central part of the bottom of the bottle obtained by blow-moulding of said preform, thereby achieving also the second object of the invention. This objective is particularly important because it allows to improve the mechanical resistance of the bottle to impacts, eliminating, or significantly reducing, the fragility area which, in conventional bottles, consists of an annular band of the bottle bottom wherein transition area between the small-thickness peripheral area and the large-thickness central area takes place.

The present invention has been described with reference to a preferred embodiment of the same, but it is clear that a number of other embodiments using the principle of the invention may differ from said embodiment. The invention is hence in no way limited by the features of the described embodiment, but only by the invention definitions found in the accompanying claims.

The invention claimed is:

1. A preform of plastic material for manufacturing hollow bodies through a blow-molding process, the preform being configured to receive a stretching rod therein, the preform comprising:
    a substantially cylindrical central body having a main cylindrical body portion having an open end, and a closed end portion including a head portion and a hollow appendix projecting outwards of the head portion in correspondence to a central area of the preform, the hollow appendix having an externally convex surface and an internally concave surface, the internally concave surface of the hollow appendix configured to receive the stretching rod therein, the overall height of the closed end portion of the preform being equal to the radius of the cylindrical central body of the preform.

2. The preform as claimed in claim 1, wherein said hollow body is a bottle or a jar, and
    the open end forms a neck area of a finished bottle or jar, and a seat of a cap of the finished bottle or jar.

3. The preform as claimed in claim 1, wherein at least a central portion of the appendix has a spherical, elliptical or parabolic shape.

4. The preform as claimed in claim 3, wherein said appendix is radiussed to a remaining side portion of said closed end portion of the preform.

5. The preform as claimed in claim 4, wherein said appendix has a spherical shape.

6. The preform as claimed in claim 5, wherein said appendix has a radius equal to that of an externally concave surface connecting the appendix to the remaining side portion of the closed end portion of the preform.

7. The preform as claimed in claim 5, wherein the side portion of the closed end portion adjacent to the central appendix has a spherical, elliptical or parabolic shape.

8. The preform as claimed in claim 1, wherein said central appendix has an internal clearance at least sufficient to house a free end of the stretching rod.

9. The preform as claimed in claim 2, wherein at least a central portion of the appendix has a spherical, elliptical or parabolic shape.

10. The preform as claimed in claim 6, wherein the side portion of the closed end portion adjacent to the central appendix has a spherical, elliptical or parabolic shape.

11. The preform as claimed in claim 2, wherein the central appendix has an internal clearance at least sufficient to house the free end of the stretching rod.

12. The preform as claimed in claim 3, wherein the central appendix has an internal clearance at least sufficient to house the free end of the stretching rod.

13. The preform as claimed in claim 4, wherein the central appendix has an internal clearance at least sufficient to house the free end of the stretching rod.

14. The preform as claimed in claim 5, wherein the central appendix has an internal clearance at least sufficient to house the free end of the stretching rod.

15. The preform as claimed in claim 6, wherein the central appendix has an internal clearance at least sufficient to house the free end of the stretching rod.

16. The preform as claimed in claim 7, wherein the central appendix has an internal clearance at least sufficient to house the free end of the stretching rod.

17. The preform as claimed in claim 1, wherein at least a central portion of the appendix has a spherical, elliptical or parabolic shape.

18. The preform as claimed in claim 17, wherein the appendix is radiussed to a remaining side portion of the closed end portion of the preform.

19. A preform of plastic material for manufacturing a bottle or jar through a blow-molding process, the preform being configured to receive a stretching rod therein, the preform comprising:
   a substantially cylindrical central body having a main cylindrical body portion having an open end, and a closed end portion including a head portion and a hollow appendix projecting outwards of the head portion in correspondence to a central area of the preform, the hollow appendix having an externally convex surface and an internally concave surface, the internally concave surface of the hollow appendix configured to receive the stretching rod therein, the overall height of the closed end portion of the preform being equal to the radius of the cylindrical central body of the perform.

20. The preform as claimed in claim 19, wherein the open end forms a neck area of the finished bottle or jar, and a seat of a cap of the finished bottle or jar.

\* \* \* \* \*